Jan. 13, 1942.   R. MILLENAAR   2,269,679
RELIEF AND SIGNAL APPARATUS FOR STORAGE BATTERIES
Filed Nov. 15, 1939

INVENTOR.
RICHARD MILLENAAR.
BY Allen & Allen
ATTORNEYS.

Patented Jan. 13, 1942

2,269,679

UNITED STATES PATENT OFFICE 2,269,679

RELIEF AND SIGNAL APPARATUS FOR STORAGE BATTERIES

Richard Millenaar, Holland, Ill., assignor to The Richardson Company, Lockland, Ohio, a corporation of Ohio Application November 15, 1939, Serial No. 304,591

6 Claims. (Cl. 136—178)

My invention is concerned with devices for giving an overfill signal in storage batteries while providing for adequate gas venting. The general object of my invention are the provision of a simple, inexpensive structure which is positive in action, which does not complicate manufacturing operations, nor interfere at all with the filling or other handling given a battery in use. A further general object is the provision of a structure which is not liable to breakage or failure of parts, and in which the only moving element is one which can be removed or replaced, if desired, without dis-assembling the battery. Still another general object is the provision of a structure in which the effective gas venting level is as high within the hollow interior of the cell cover as possible, and is higher than has hitherto been feasible with valved structures. Still another general object is the provision of a structure in which the filling opening itself is free of valve mechanism, and the provision of a structure in which the filler opening may, if desired, be completely sealed off by an unvented filler cap so that in use no electrolyte can leave the cell through the filler opening.

My invention is related to the copending case of Charles L. Keller entitled Non-overfill and relief devices, Serial No. 304,590 filed November 15, 1939, in that a check or relief valve structure is employed in the place of a valve mechanism having positive mechanical actuation.

The general objects of my invention as well as more specific ones which will be set forth hereinafter or will be apparent to one skilled in the art upon reading these specifications, I accomplish by that certain construction and arrangement of parts of which I shall now describe an exemplary embodiment, reference being had to the accompanying drawing in which.

Figure 1:
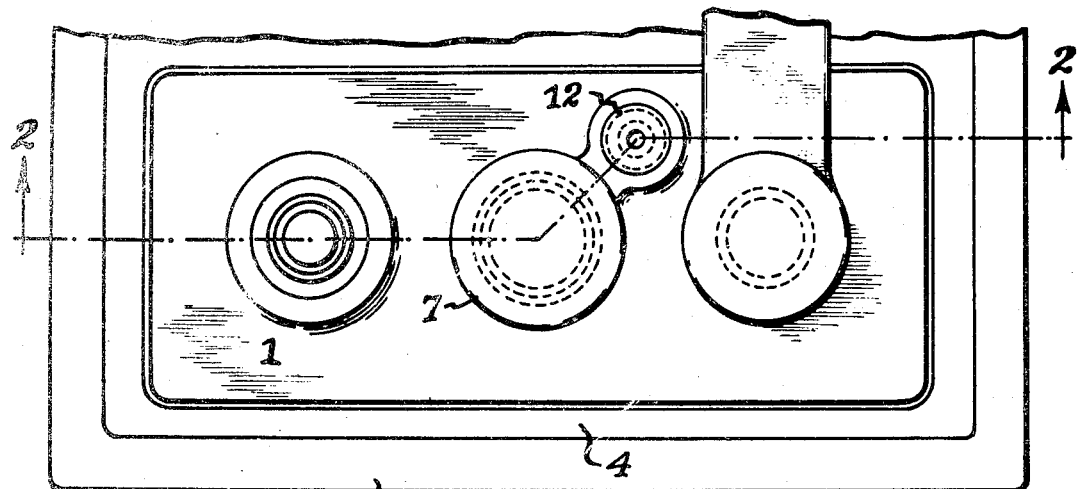
Figure 1 is a top plan view of a portion of a storage battery showing a cell cover embodying my invention.
Figure 2:
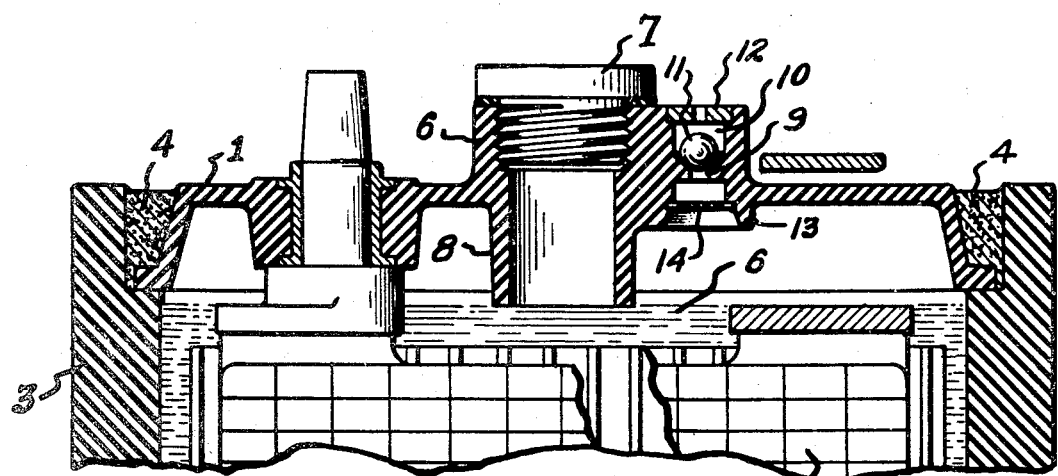
Figure 2 is a partial sectional view taken along the lines 2—2 of Figure 1.

In the practice of my invention in the exemplary embodiment, I provide a cell cover 1 having the usual hollow body, and a depending skirt 2 by which it may be sealed to the cell walls 3 by the sealing compound 4. The cell walls of course form part of the usual storage battery case; and the plate assembly in the cell is indicated at 5 and the electrolyte at 6. The cell cover has the usual openings for the terminal posts of the plate assembly. While I have shown a particular form of cell cover, it will hereinafter be apparent to the worker in the art that my invention is equally applicable to other forms of cell cover, including a cover which is common to all of the cells in the storage battery case.

The cover is provided with a filler opening indicated generally at 6, and with a filler cap 7. The walls of the filler opening conventionally rise somewhat above the level of the top of the cell cover as shown, though this is not necessary. The cell cover is formed to provide a tubular extension 8 for the filler opening, which terminates downwardly at a desired maximum electrolyte level. Water or electrolyte may be introduced into the cell through the filler opening and tubular extension when the filler cap is removed.

The gas collection space within the cell cover above the maximum electrolyte level is vented through the cell cover elsewhere than through the filler opening. To this end a gas venting orifice 9 is provided. Preferably, though not necessarily, this orifice is located near the filler opening. The material of the body of the cell cover is so shaped adjacent this orifice as to provide a cup or space 10 in which a valve member is located; and the bottom of the cup is so shaped adjacent the orifice as to provide a valve seat. I have shown a valve member 11 in the form of a ball loosely resting in the cup upon the valve seat. The top of the cup may be provided with a washer or perforated closure member 12 which may have a press fit in the top of the cup, and which may rest against a shoulder to keep it sufficiently above the top of the ball. The closure member prevents dislodgment of the ball from the cup, while permitting up and down movement of the valve.

By suitably thickening the walls of the cell cover adjacent the vent opening 9 it is possible to locate the so-called cup, valve and even the vent opening itself above the general level of the top of the cell cover, thus venting the gas collection space at the highest possible point. About the orifice 9 I may provide a depending skirt 13 within the cell cover, and support therein a splash washer 14 to minimize the tendency for electrolyte spray to reach the orifice 9 and the valve thereabove.

While I have shown and described the cup as a depression cylindrical in cross-section and the valve as a ball, it will be understood that other shapes of valve and housing therefor may be employed within the scope of my invention.

So long as the valve member remains on its seat the gas collection space beneath the cell cover is unvented. As a consequence, in filling the cell, as soon as the electrolyte level reaches the end of the tubular extension 8, the electrolyte will begin to rise within the said extension, thus giving the operation a signal that the filling operation is complete and should be discontinued. How far the electrolyte or water will rise in the tubular extension will depend primarily upon the weight of the valve member 11, which, if desired, may be made sufficiently heavy to counterbalance a column of liquid the whole length of the tubular extension. However, this is not necessary, since any rise of liquid in the tubular extension will be immediately apparent. The efficacy of the signal is increased because of the popping action of the valve, in consequence of which the liquid level within the tubular extension oscillates up and down, especially when the battery is gassing as it is being filled.

Thus the valve 11, while it may be made of antimonial lead, as an example of a non-corrosive heavy metal, may also be made of much lighter materials such as hard or soft rubber or acid resistant moulding compositions of various kinds. The valve may, if desired, be pivoted and/or spring-controlled; but this is not necessary.

I prefer to employ an imperforate filler cap 7; but where the valve is insufficiently heavy to counterbalance a column of liquid of the entire length of the tubular extension, a filler cap which has one or more gas vent openings may be employed.

Modifications may be made in my exemplary embodiment without departing from my invention, and specifically, but without limitation, in the particular placement of parts illustrated and described.

Having thus set forth my invention in said exemplary embodiment, what I claim as new and desire to secure by Letters Patent is:

1. A cell cover for electric storage batteries having a top provided with a filler opening having walls defining a tubular extension extending sufficiently below said top to provide a gas collection space above the electrolyte in said battery when the level of said electrolyte is substantially at the downward termination of said tubular extension, said cell cover having a gas venting opening in its top at a place removed from said filler opening, and an automatically acting, weight operated check valve in connection with said gas venting opening, said valve acting to prevent passage of gas from said gas collection space through said gas venting opening until said gas is of sufficient pressure to open said valve, said valve having a mass sufficient at least in part to counterbalance a column of electrolyte in said tubular extension, whereby upon filling said battery through said filler opening, as soon as the electrolyte level has reached the downward end of said tubular extension it will be caused to rise therein, thus giving an overfill signal.

2. A cell cover for electric storage batteries having a top provided with a filler opening having walls defining a tubular extension extending sufficiently below said top to provide a gas collection space above the electrolyte in said battery when the level of said electrolyte is substantially at the downward termination of said tubular extension, said cell cover having a gas venting opening in its top at a place removed from said filler opening, and an automatically acting, weight operated check valve in connection with said gas venting opening, said valve acting to prevent passage of gas from said gas collection space through said gas venting opening until said gas is of sufficient pressure to open said valve, said valve having a mass sufficient at least in part to counterbalance a column of electrolyte in said tubular extension, whereby upon filling said battery through said filler opening, as soon as the electrolyte level has reached the downward end of said tubular extension it will be caused to rise therein, thus giving an overfill signal, said filler opening being provided with a removable imperforate filler cap.

3. A cell cover for electric storage batteries having a top provided with a filler opening having walls defining a tubular extension extending sufficiently below said top to provide a gas collection space above the electrolyte in said battery when the level of said electrolyte is substantially at the downward termination of said tubular extension, said cell cover having a gas venting opening in its top at a place removed from said filler opening, and an automatically acting, weight operated check valve in connection with said gas venting opening, said valve acting to prevent passage of gas from said gas collection space through said gas venting opening until said gas is of sufficient pressure to open said valve, said valve having a mass sufficient at least in part to counterbalance a column of electrolyte in said tubular extension, whereby upon filling said battery through said filler opening, as soon as the electrolyte level has reached the downward end of said tubular extension it will be caused to rise therein, thus giving an overfill signal, said automatically acting check valve comprising a portion of said cell cover top formed to provide a ball receiving chamber, a perforated valve seat in said chamber, and a ball valve member resting by gravity on said seat so as to close the perforation therein.

4. A cell cover for electric storage batteries having a top provided with a filler opening having walls defining a tubular extension extending sufficiently below said top to provide a gas collection space above the electrolyte in said battery when the level of said electrolyte is substantially at the downward termination of said tubular extension, said cell cover having a gas venting opening in its top at a place removed from said filler opening, and an automatically acting, weight operated check valve in connection with said gas venting opening, said valve acting to prevent passage of gas from said gas collection space through said gas venting opening until said gas is of sufficient pressure to open said valve, said valve having a mass sufficient at least in part to counterbalance a column of electrolyte in said tubular extension, whereby upon filling said battery through said filler opening, as soon as the electrolyte level has reached the downward end of said tubular extension it will be caused to rise therein, thus giving an overfill signal, said automatically acting check valve comprising a portion of the top of said cell cover configured to provide an upwardly open ball receiving chamber, said chamber having a perforated valve seat, a ball valve member in said chamber and adapted to rest by gravity on said seat, and a perforated member inserted in the top of said ball receiving chamber to retain said ball therein, said chamber being of such size as to permit said ball to leave said seat under conditions of gas pressure.

5. A cell cover for electric storage batteries having a top provided with a filler opening having walls defining a tubular extension extending sufficiently below said top to provide a gas collection space above the electrolyte in said battery when the level of said electrolyte is substantially at the downward termination of said tubular extension, said cell cover having a gas venting opening in its top at a place removed from said filler opening, and an automatically acting, weight operated check valve in connection with said gas venting opening, said valve acting to prevent passage of gas from said gas collection space through said gas venting opening until said gas is of sufficient pressure to open said valve, said valve having a mass sufficient at least in part to counterbalance a column of electrolyte in said tubular extension, whereby upon filling said battery through said filler opening, as soon as the electrolyte level has reached the downward end of said tubular extension it will be caused to rise therein, thus giving an overfill signal, said automatically acting check valve comprising a portion of the top of said cell cover configured to provide an upwardly open ball receiving chamber, said chamber having a perforated valve seat, a ball valve member in said chamber and adapted to rest by gravity on said seat, and a perforated member inserted in the top of said ball receiving chamber to retain said ball therein, said chamber being of such size as to permit said ball to leave said seat under conditions of gas pressure, said cell cover top also being configured to provide a downwardly open chamber below said valve seat, and a splash washer in said downwardly open chamber to assist in the separation of electrolyte from gases passing therethrough.

6. The structure claimed in claim 4 wherein said ball valve chamber is located at least partially above the top of said cell cover.

RICHARD MILLENAAR.